Nov. 4, 1958 C. W. LINCOLN ET AL 2,858,805
MEANS FOR REDUCING RELIEF VALVE SQUEAL
IN A HYDRAULIC POWER STEERING GEAR
Filed Jan. 11, 1954 3 Sheets-Sheet 3
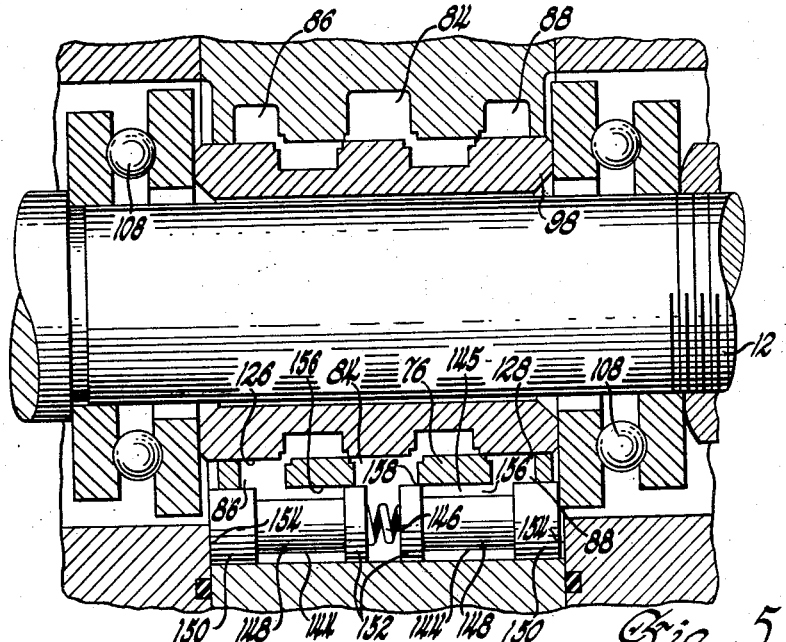
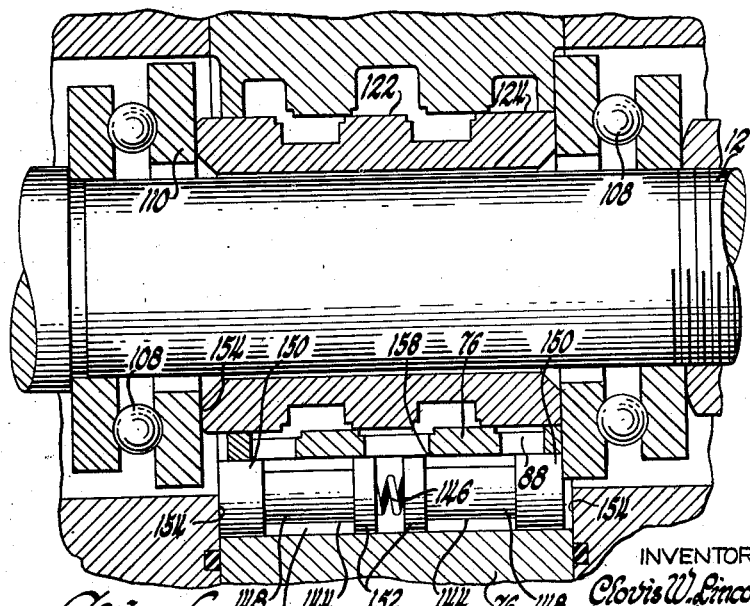
INVENTORS
Clovis W. Lincoln,
Wayne K. Watling &
W. Blair Thompson
BY
C. H. Sibbe
ATTORNEY

United States Patent Office 2,858,805
Patented Nov. 4, 1958

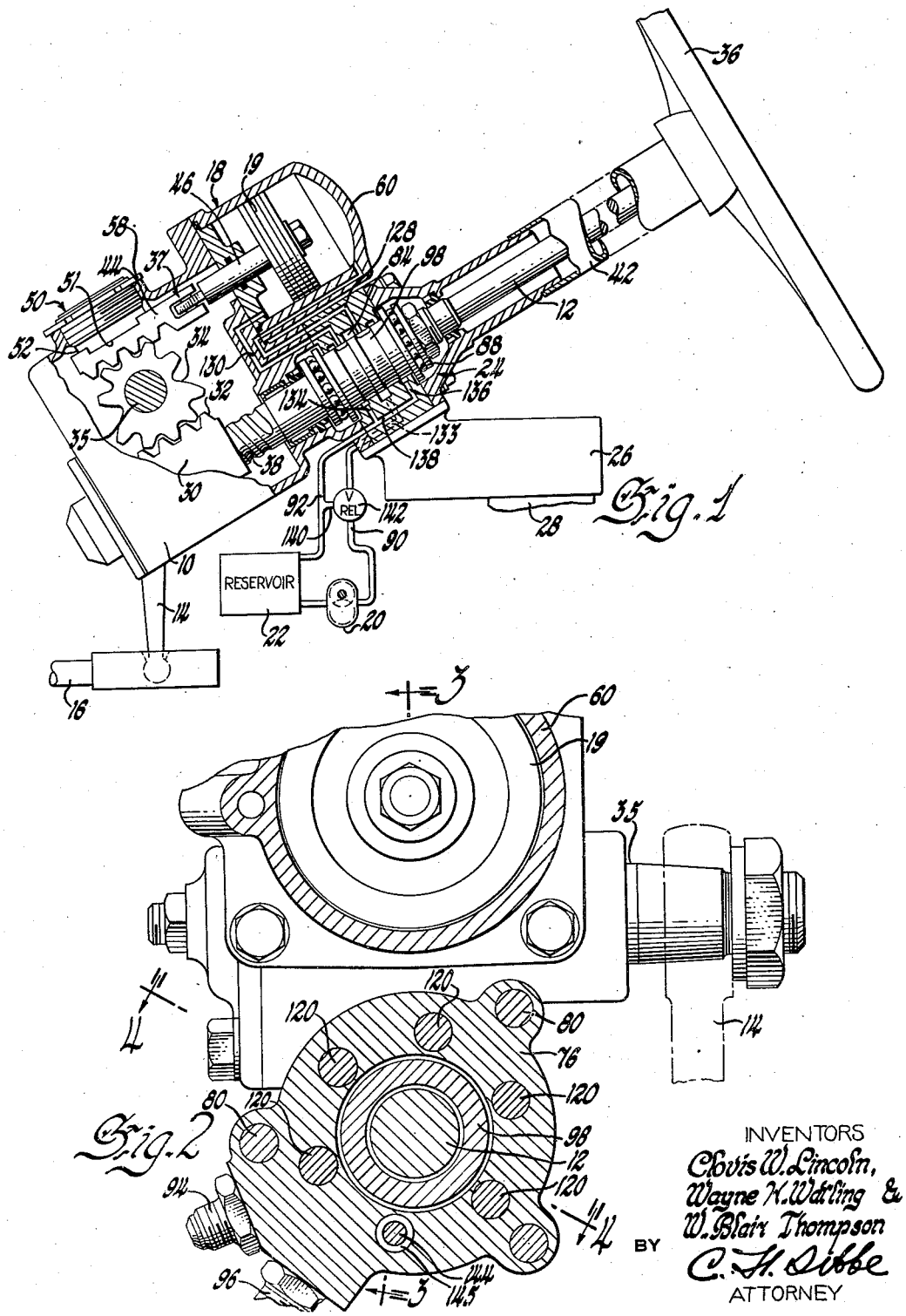

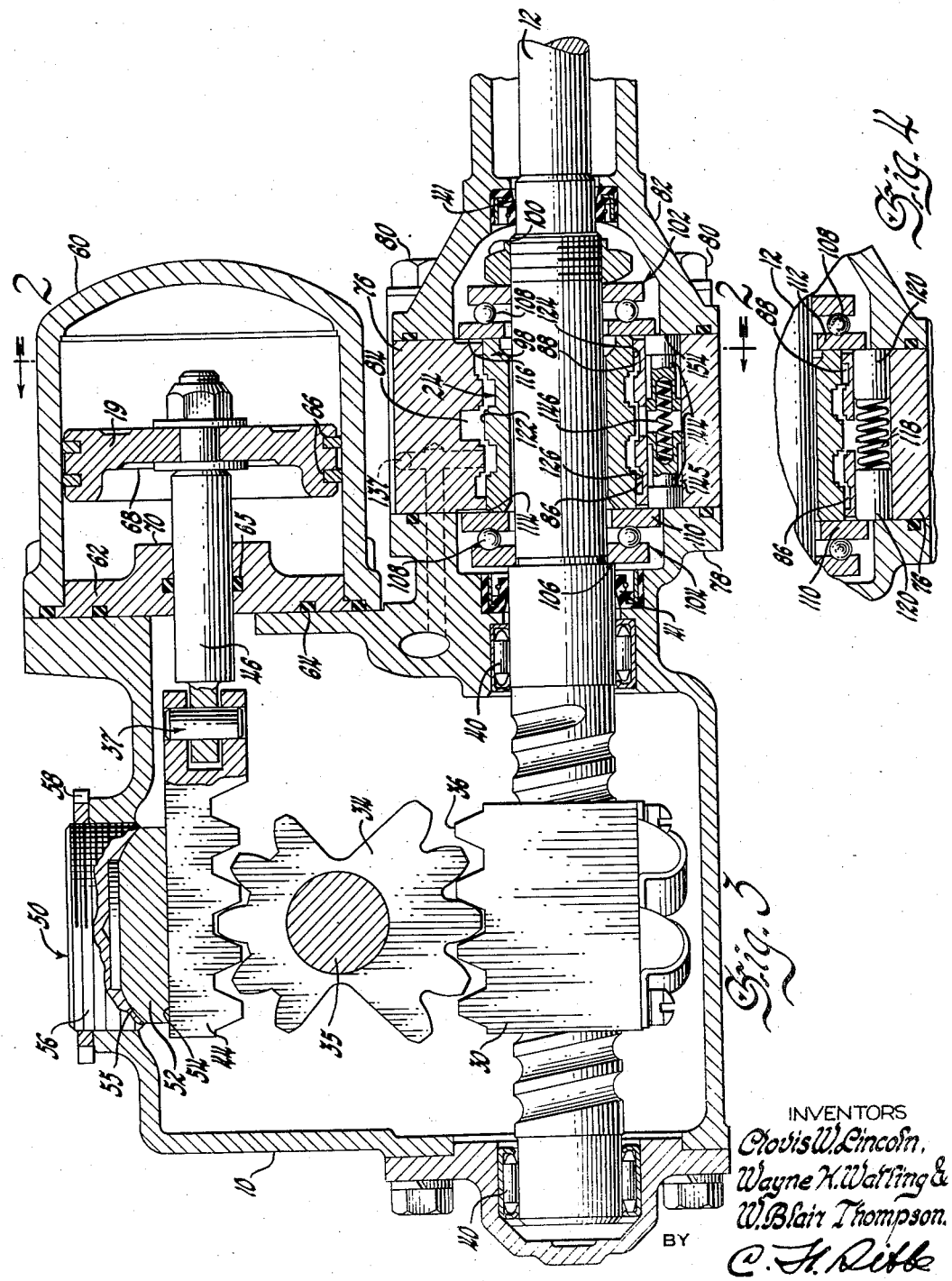

2,858,805

MEANS FOR REDUCING RELIEF VALVE SQUEAL IN A HYDRAULIC POWER STEERING GEAR

Clovis W. Lincoln, Wayne H. Watling, and William Blair Thompson, Saginaw, Mich., assignors to General Motors Corporation, Detroit, Mich., a corporation of Delaware Application January 11, 1954, Serial No. 403,198

5 Claims. (Cl. 121—46.5)

This invention relates to fluid-powered servo mechanisms, particularly as applied to the power steering of automotive vehicles and the like.

Hydraulic power steering gears heretofore proposed are open to objection on various grounds. Thus, these gears have been deservedly criticized on the basis that they are lacking in the compactness which characterizes any properly engineered product of the general class. Another criticism goes to the strain placed by the previously suggested gears on the steering linkage and other parts combined in the gear. Noisy operation, especially of the relief valve component of the system, represents a further fault of the prior constructions, this fault being particularly noticeable as the dirigible wheels of the vehicle approach their "hard over" position near the wheel stops.

As indicated, the present invention has as its principal objects to provide a hydraulic power steering gear which represents a unified package, demanding a minimum of space for its installation and which is not prone to strain the associated mechanisms or to give rise to an undue amount of relief valve noise.

A further object is to provide an improved valve construction generally applicable to servo mechanisms employing a fluid motor. Other objects and features of the invention will be apparent from the following specific description, illustrating a preferred embodiment thereof. The description will proceed with reference to the accompanying drawing in which:

Figure 1 shows the particular gear as normally installed, certain parts appearing in section and/or in side elevation, other parts being represented diagrammatically;

Figure 2 is a fragmentary section on the line 2—2 in Figure 3;

Figure 3 is an enlarged longitudinal section showing the principal parts;

Figure 4 is a fragmentary section on the line 4—4 in Figure 2; and

Figures 5 and 6 are operational views.

Referring first to Figure 1, it will be observed that the illustrated system includes a gear box or casing 10 confining means for translating the rotary motion of the steering shaft 12 into a rocking motion, manifested through the pitman or drop arm 14, operably connected to the drag link 16; a fluid motor 18 comprising a double acting piston 19; a pump 20, drawing from a reservoir 22; and an "open center" valve 24, controlling the flow of the fluid medium to the motor 18. A bracket mounting 26 secures the principal parts to the frame 28 of the vehicle.

While hydraulic operation of the gear is preferred, as indicated, the same may be adapted for vacuum operation or for operation by means of compressed air, if desired.

The means for attaining the desired rocking movement of the pitman arm 14, shown as having a ball and socket connection with the drag link 16, include a conventional ball nut 30, the rack teeth 32 of which engage with the teeth of one sector of a double sector gear 34 fixed to or integral with the cross shaft 35.

As well understood by those familiar with this art, the ball nut incident to the steering of the vehicle, is caused to move up or down on worm 38, integral with the shaft 12; the direction of movement of the nut being determined by the direction of rotation of the steering wheel 36 fixed to the upper end of the shaft.

Shaft 12 turns in needle bearings 40 (Figure 3) at either end of the worm 38 and in oil seals 41 at either end of the valve 24. The shaft is housed upwardly of the valve by a mast jacket 42, terminating at the base of the steering wheel, and is supported for limited axial movement.

The upper sector teeth of the double sector gear 34 within the casing 10 will be noted as meshing with the teeth of a rack 44 having a pin and yoke connection 37 with the shaft or stem 46 of the piston 19. An adjustor, generally indicated by the numeral 50, serves to maintain the rack and sector teeth in proper engagement. The adjustor includes a bearing block 52 having portions 54 straddling the back of the rack 44 (Figure 1) so as to guide the same. In order to render the block self-aligning, the upper surface thereof is spherically formed at 55 in a manner complementary to the under surface of a screw member 56 threaded into the casing 10. It should be clear that turning of the screw member downwardly against the bearing block 52 operates to eliminate any undesired lash between the rack and gear sector. Once the proper adjustment has been made, loosening of the screw member is precluded by a locking nut 58.

Cylinder 60, within which the piston 19 is confined, is secured directly to the gear box 10. A circular adapter plate 62 supplies a bearing for the piston shaft 46 and provides the necessary partition between the cylinder and gear box. Leakage at the flange face between the cylinder and gear box is prevented by annular sealing rings 64. A similar sealing ring 65 surrounds the shaft 46 within the adapter, which is annularly recessed to accommodate the ring.

Piston 19 carries a pair of piston rings 66 and has a recessed face 68 accommodating the boss portion 70 of the adapter on full over leftward movement of the piston.

Control valve 24, which will now be described, is of the spool type and includes a housing 76 held fast to a flange portion 78 of the gear box 10 by bolts 80. These bolts pass through a flanged casing member 82 extending upwardly to join with the lower end of the mast jacket 42.

The valve housing 76 is internally bored and counter-bored to form annular oil channels 84, 86 and 88. Channel 84 connects via a passageway 133 with line 90 (Figure 1) from the pump 20, while channels 86 and 88 connect through passageways 134 and 136, respectively, joining within the valve in a common passageway 138, with the line 92 terminating at the reservoir 22. Hose fixtures 94 and 96 seen in Figure 2 correspond to the lines 90 and 92, respectively. These lines should be noted as interconnected through a by-pass line 140 and a relief valve 142, which may be of the spring-loaded ball type, for example. The relief valve operates to relieve the pressure in the pump discharge line whenever such pressure exceeds a predetermined value, calculated to avoid damage to any of the components of the system.

A spool element 98 confined within the housing 76 is made fast to the steering shaft 12, so as to participate in any axial movement thereof, by a nut 100 threaded on the shaft. This nut loads an upper thrust bearing 102 which, through the spool 98, loads a lower thrust bearing 104, in turn abutting an annular shoulder 106 formed incident to the fabrication of the steering shaft. Balls 108 facilitate rotary movement of the steering shaft relative to the valve spool. The limits within which the steering shaft (or the valve spool) can move in an axial direction is set by the depth of the annular recesses 114 and 116 in the housing member 76.

The valve spool 98 is normally maintained in its centered position within the housing by means including a plurality of springs 118 (Figure 4) which operate to resist axial movement of the spool and steering shaft in either direction. These springs are housed between plunger pairs 120, (Figures 2 and 4) abutting the inner ring components 110 and 112 of the thrust bearings. The springs and plunger pairs are contained in bores in the housing 76, five sets being incorporated in the particular valve (Figure 2). Each of the bores opens to the annular channel 84 for a reason which will subsequently appear.

Spool 98 has a central land 122 and a pair of end lands 124 and 126 of the same diameter as the central land. The central land 122 controls the fluid flow within the valve, annular channel 84 connecting with the inlet porting as previously described, while lands 124 and 126 are functional with respect to passageways 128 and 130, respectively. These latter passageways, as will be seen from Figure 1, interconnect the valve and the fluid motor, passageway 128 terminating at the right hand end of the cylinder 60, pasageway 130 at the left hand end thereof. In this figure, to simplify an understanding of the invention, all of the internal passageways comprised in the system are shown diagrammatically and in certain instances out of true position. In the commercial gear open ends of the drilled lines that do not constitute part of the hydraulic circuit are closed by pressing a steel plug into the opening. One of these plugs is shown at 137 in Figure 3.

With the valve spool in its normal centered position, the hydraulic fluid from the pump 20, preferably powered from the engine of the vehicle, is divided into two streams at the central land 122. The stream diverted to the left flows across the annular channel mediate the central land and the end land 126, thence through the passageway 134 to the common return passageway 138. Similarly the stream diverted to the right flows across the annular space between the central land and the end land 124, thence through the passageway 136 to the passageway 138. Lines 128 and 130 being fully open when the valve spool is centered, both ends of the cylinder 60 are normally filled with fluid, maintained under a static pressure by the circulation of the fluid medium as just described.

As previously noted, the annular chamber 84 connecting with the inlet 133 from the pump is, at all times, open to the bores housing the springs 118. Thus, when the spool is moved axially to confine the fluid flow to one side or the other of the valve, the pressure which develops in such side (and in the corresponding chamber of the power cylinder) is applied in aid of the springs against the inner walls of the plungers 120. Accordingly, the resistance which must be overcome by the force tending to move the spool represents (disregarding friction) the sum of the force of the springs and the force of the developed pressure as applied to the plungers. This resistance may amount, for example, to from about two to eight pounds, being determined in any given case by the preloading of the springs 118 and is advantageous as providing a steering "feel" which would otherwise be lacking.

In addition to the plungers 120, valve 24 includes a pair of plunger 144 (Figures 2, 3, 5 and 6), contained in a bore 145 in the valve member 76, each housing a portion of a spring 146 tending to force the plungers apart. The spring 146 is quite light relative to the spring 118 and although the plungers 144 like the plungers 120 abut the inner ring components of the thrust bearings and the shoulders 154, it has virtually no centering effect.

The plungers 144 are spool-like in form, each having a body portion 148 and rim portions 150 and 152 of greater diameter than the body portion. With the valve spool 98 in its centered position within the housing 76, pressure fluid is free to enter the space between the plungers and the cavities in which the ends of the spring 146 are confined. The annular space 156 surrounding the body portion 148 of each plunger is normally sealed off from the inlet channel 84 by the corresponding rim 152. However, when the valve spool is moved, as to the left, for example, this rim begins to leave the adjacent edge 158 of the housing 76 (Figure 5) and at the stage of movement of the valve spool shown by Figure 6, the rim has carried beyond such edge to interconnect the inlet channel 84 and the right-hand exhaust channel across the annular groove between the central land 122 and the end land 124. Thus, as will subsequently be better understood, the plungers 144 in effect constitute a by-pass valve, with the rims 152 functioning as lands.

To describe now the general operation of the gear, let it be assumed that the vehicle is in motion and that the steering wheel 36 is rotated clockwise to negotiate a right turn. Clearly any resistance on the part of the cross shaft 35 to turning will be manifested in a reactionary axial thrust on the shaft 12 tending to cause longitudinal movement of the shaft. Now, if the resistance is less than the spring centering force, no axial movement of the shaft and consequently no axial movement of the valve spool occurs, with the result that the vehicle is steered around the curve or corner solely by manual effort. On the other hand, if the resistance to turning of the shaft 35 is greater than the spring centering force, the steering shaft, and with it the spool 98, is caused to move axially downwardly to bring about partial or complete confinement of the fluid flow (depending upon the exact magnitude of the steering resistance) to the right-hand chamber of the cylinder and partial or complete closing of the passageway 136 which represents the exhaust line from such chamber. Piston 19 and rack 44 are consequently forced to the left to rock the cross shaft 35 in a counterclockwise direction, this action being accompanied by exhaustion of fluid from the left chamber of the cylinder through the passageway 134. A steering linkage bringing about turning of the dirigible wheels of the vehicle to the right on rearward movement of the drag link 16 is, of course, assumed.

Should the steering shaft be rotated in a counterclockwise direction to effect a leftward turning of the dirigible wheels, it should be clear that the action will be just the opposite of that above described.

Reverting now to the plunger pairs 144 and the associated spring 146, it should be apparent on reflection that in general it is only during parking or low speed maneuvering in close quarters that the dirigible wheels of the vehicle are swung to full-over position corresponding to maximum displacement of the power piston. Under the indicated conditions, resistance to the turning of the dirigible wheels is highest, resulting in maximum displacement of the control valve spool. With a conventional hydraulic gear, during a tight parking operation involving full turning of the dirigible wheels, the distracting squeal occasioned by the opening of the pressure relief valve (142) may occur repeatedly. According to the invention, however, before the dirigible wheels reach their stops and before the power piston reaches the end of the cylinder, the pressure behind the piston is relieved by the action of the affected valve 144, 145 and the squeal prevented except under abnormal conditions. Thus assuming a right all-over turn, the downward reactionary movement of the steering shaft carries the valve 144 leftward (Fig. 5) until in the wide open position of the control valve the rim or flange 152 of the valve 144 clears the valving edge 158 so that the pressure fluid is permitted to exhaust from the system via channel 188 and conduit 92 (Fig. 1). The progressive reduction in the pressure behind the piston has a cushioning effect, removing the possibility of the impartation of an abrupt shock to any of the steering parts beyond the piston.

Having thus described our invention, what we claim is:

1. In a fluid system including a fluid motor, a control valve for said motor comprising a pair of telescopically related members, the outer of which has a pressure port and an exhaust port therein, and actuating means for moving one of said members relative to the other to energize said motor, the combination of auxiliary valve means associated with said actuating means for actuation thereby, said auxiliary valve means in operation of the control valve being displaced by said actuating means to progressively interconnect the said inlet and exhaust ports as the said one of said members nears its position of maximum displacement.

2. In a fluid system including a fluid motor, a control valve for said motor comprising a pair of telescopically related members, the outer of which has a pressure port and an exhaust port therein, and actuating means for moving one of said members axially of the other to energize said motor, the combination of auxiliary valve means associated with said actuating means for actuation thereby, said auxiliary valve means being spaced radially of the inner of said members and in operation of the valve being displaced by said actuating means to progressively interconnect the said inlet and exhaust ports as the said one of said members nears its position of maximum displacement.

3. In a fluid system including a fluid motor, a control valve for said motor comprising a pair of telescopically related members, the outer of which has a pressure port and an exhaust port therein, and actuating means for moving the inner of said members axially of the outer to energize said motor, the combination of auxiliary valve means associated with said actuating means for actuation thereby, said auxiliary valve means being spaced radially outward of the inner of said members and in operation of the valve being displaced by said actuating means to progressively interconnect the said inlet and exhaust ports as the said inner of said members nears its position of maximum displacement.

4. In a fluid system including a fluid motor, a control valve for said motor comprising a pair of telescopically related members of which the outer has a pressure port and an exhaust port therein and actuating means for moving the inner of said members axially of the outer to energize said motor, said actuating means taking the form of a shaft extending through the inner of said members and carrying a pair of annular elements encircling said shaft to abut the ends of said inner member, the combination of auxiliary valve means adapted to be engaged by said annular elements on the axial movement of said shaft, said auxiliary valve means being spaced radially outward of the inner of said members and in operation of the valve being displaced by said annular elements to progressively interconnect said inlet and exhaust ports as the inner of said members nears its position of maximum displacement.

5. An auxiliary valve according to claim 4 which takes the form of a spool element accommodated in a bore in said outer member.

References Cited in the file of this patent

UNITED STATES PATENTS

| | | |
|---|---|---|
| 2,109,162 | Boehle | Feb. 22, 1938 |
| 2,221,150 | Rebeski | Nov. 12, 1940 |
| 2,605,854 | MacDuff | Aug. 5, 1952 |
| 2,631,571 | Parker | Mar. 17, 1953 |
| 2,810,930 | MacDonald | Oct. 29, 1957 |